United States Patent
Julka et al.

(10) Patent No.: US 7,623,865 B2
(45) Date of Patent: Nov. 24, 2009

(54) FORCED REGISTRATION IN CONCURRENT SERVICES MOBILE STATION HANDOFF

(75) Inventors: Vibhor Julka, San Diego, CA (US); Roger Gustavsson, San Diego, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1296 days.

(21) Appl. No.: 10/210,146

(22) Filed: Jul. 31, 2002

(65) Prior Publication Data
US 2004/0203780 A1 Oct. 14, 2004

(51) Int. Cl.
H04W 36/00 (2006.01)
H04W 4/00 (2006.01)

(52) U.S. Cl. ............ 455/439; 455/436; 455/435.1; 455/453; 455/403; 455/422.1; 370/331; 370/332; 370/328; 370/338

(58) Field of Classification Search ............. 455/436, 455/439, 437, 438, 435.1, 433, 422.1, 403, 455/453; 370/331, 328, 325, 338
See application file for complete search history.

(56) References Cited

U.S. PATENT DOCUMENTS

| | | | |
|---|---|---|---|
| 5,982,759 A * | 11/1999 | Jo et al. ............ | 370/331 |
| 6,070,075 A * | 5/2000 | Kim .................. | 455/437 |
| 6,205,128 B1 * | 3/2001 | Le .................... | 370/331 |
| 6,208,634 B1 | 3/2001 | Boulos et al. | |
| 6,259,923 B1 | 7/2001 | Lim et al. | |
| 6,343,070 B1 | 1/2002 | Klas et al. | |
| 6,434,387 B1 * | 8/2002 | Lee ................... | 455/436 |
| 6,438,378 B1 * | 8/2002 | Kouno .............. | 455/439 |
| 6,449,481 B1 * | 9/2002 | Kwon et al. ...... | 455/437 |
| 6,620,014 B1 * | 9/2003 | Lindgren ........... | 455/446 |
| 6,671,265 B1 * | 12/2003 | Hwang et al. .... | 370/331 |
| 6,810,256 B2 * | 10/2004 | Stuempert et al. | 455/439 |
| 2001/0016493 A1 * | 8/2001 | Kim et al. ......... | 455/436 |
| 2002/0009997 A1 * | 1/2002 | Stuempert et al. | 455/439 |
| 2002/0048266 A1 * | 4/2002 | Choi et al. ........ | 370/331 |
| 2002/0111169 A1 * | 8/2002 | Vanghi .............. | 455/436 |
| 2003/0053430 A1 * | 3/2003 | Choi et al. ........ | 370/331 |
| 2003/0185183 A1 * | 10/2003 | Lohtia et al. ..... | 370/338 |
| 2004/0008645 A1 * | 1/2004 | Janevski et al. .. | 370/331 |
| 2004/0053615 A1 * | 3/2004 | Kim et al. ......... | 455/436 |

* cited by examiner

Primary Examiner—Huy Q Phan
(74) Attorney, Agent, or Firm—Coats & Bennett, P.L.L.C.

(57) ABSTRACT

A wireless communication network, such as a 1xEV-DV network, manages concurrent services handoff to force re-registration of concurrent-services capable mobile stations that have undergone hard handoff during an active voice call. During such handoffs, the mobile station moves from a source base station to a target base station, each supporting concurrent services, and with each base station having associated network identification parameters. In response to receiving the mobile station in hard handoff while it is engaged in an active voice call, the target base station sends one or more of these network identification parameters as dummy values, which results in re-registration of the mobile station on the voice side of the network. The target base station broadcasts actual network identification parameters on one or more overhead channels such that the mobile stations operating in its coverage area have access to true network identification parameters.

47 Claims, 10 Drawing Sheets

FORCED REGISTRATION IN CONCURRENT SERVICES MOBILE STATION HANDOFF

BACKGROUND OF THE INVENTION

The present invention generally relates to mobile station registration within a wireless communication network, and particularly relates to handoff procedures involving base stations that support concurrent services, e.g., voice and packet data services.

Wireless communication services continuously evolve, offering wireless service users an increasingly sophisticated range of services. One of the more useful innovations involves offering users the ability to engage in concurrent services, wherein a given user has two or more concurrent connections with the wireless network. For example, the wireless network provides the user's wireless communication device, e.g., mobile station, with concurrent voice and packet data connections allowing the user to carry on a voice conversation while browsing the Web or sending and receiving email. In some instances, the user may have multiple, concurrent data connections, with or without concurrent voice service. The evolving third generation (3G) wireless networks being developed under the cdma2000 family of standards, including those based on IS-2000 and 1xEV-DV standards, stand as examples of such concurrent service networks.

As with any increase in sophistication, the push toward concurrent services capability is not without its complications. Mobility management represents an ongoing challenge. For example, in a 1xEV-DV network, mobility management involves voice and data perspectives. Packet data traffic generally is routed between mobile stations and external public data networks (e.g., the Internet) using packet data serving nodes (PDSNs) coupled to a gateway router connected to the Internet. The PDSNs in turn route data to packet control functions (PCFs), which serve one or more base stations and act as a link between the packet network and the radio network.

In contrast, legacy "voice" services (i.e., circuit-switched voice and data) are routed from the mobile stations to legacy networks such as the Public Switched Telephone Network (PSTN) through mobile switching centers (MSCs) communicatively coupled to the supporting base stations. Thus, different network entities are involved in call support depending upon whether circuit-switched or packet-switched services are active. In concurrent service environments, both voice and packet data services may be active, which requires managing mobile station mobility from the perspective of both call types.

Mobile stations within the service area of a given base station typically monitor one or more overhead channels, such as paging or broadcast channels, used by the base stations to transmit information to the mobile station, for the needed identification parameters. The base station uses such channels to transmit various information to the mobile stations, including network identification parameters, which indicate to the mobile stations their service location within the network. For example, in a 1xEV-DV network, base stations (BSs) transmit network identification (NID), system identification (SID), and packet zone identification (PZID) values.

NIDs generally are used to divide a given geographic area into one or more service areas, and multiple NIDs typically are associated with a given base station. SIDs generally are defined at the MSC level, such that one MSC and all its associated base stations (e.g., a network "system") share a unique SID. Note that NIDs may be reused from system-to-system, but SIDs are unique such that network systems are individually identifiable. PZIDs identify packet data coverage areas, which may differ from NID/SID coverage areas, since different network entities provide voice and packet services.

When a mobile station is idle, it generally recognizes its movement within a system by the changing NID values it receives, and recognizes its movement across systems by the changing SID values it receives. Similarly, changing PZIDs indicate movement across packet zone boundaries (e.g., movement across PCF coverage areas).

On the data side of the network, as the mobile station moves across a packet zone boundary, it establishes a new connection between the PCF controlling the new packet zone and the corresponding PDSN. If this corresponding PDSN is the same as the PDSN prior to the mobile station traversing the packet zone boundary, the PDSN tears down the connection to the previous PCF. If, however, the new packet zone corresponds to a different PDSN, then the new PDSN initiates new Point-to-Point Protocol (PPP) establishment procedures between the mobile station and itself, and performs mobile IP registration. In this way, as the mobile station moves, the connection to the PDSN is used to route the data to the appropriate PCF in whose coverage area the MS currently resides. The process of updating the new connection to the PDSN and any associated mobile Internet Protocol (IP) signaling may be regarded as the MS performing a "packet data registration" on the packet-switched side of the network.

On the voice side of the network, the mobile station re-registers with the network 10 as it moves through the different service areas such that location information in the mobile station's associated home location register (HLR) is updated to reflect its current service location. Such re-registration is important because the network uses the location information in the HLR to route mobile-terminated voice calls intended for the mobile station, i.e., incoming calls, to the appropriate network system. Thus, mobile station re-registration serves to update the HLR so that mobile-terminated calls are properly routed to the network entities in whose coverage area the mobile station currently resides.

An idle mobile station monitors one or more overhead channels, such as broadcast or paging channels transmitted by the base stations, for the needed identification parameters. Thus, an idle mobile station recognizes movement by receiving changed identification information on a monitored overhead channel. Such recognition generally triggers re-registration by the mobile station so that HLR information remains current. However, mobile stations generally do not monitor these overhead channels when they are engaged in active voice calls. Moreover, base stations generally are not aware of whether a given mobile station undergoing an active voice call handoff has an associated dormant packet data connection.

Because base stations generally cannot determine whether a dormant packet data session exists for a mobile station undergoing hard handoff during an active voice call, the base stations by default assume that such a connection might exist. Therefore, such base stations perform operations as part of handoff, or immediately subsequent to the handoff, to ensure that the mobile station receives updated network identification parameters such that the mobile station can re-activate any concurrent but dormant packet data session it might have. Such identification information typically is sent by the base station that received the mobile station in handoff using a channel associated with the voice call, such as a traffic channel.

Thus, the base station conveys identification parameters to the mobile station, including a current PZID, as part of receiving that mobile station in handoff. For example, in the cdma2000 family of standards, an In-System Traffic Parameters (ISTP) message is sent by dim-and-burst or blank-and-burst signaling on the voice traffic channel, or sent on an associated dedicated control channel, depending on the particular radio configuration being used. Regardless, providing the PZID value to the mobile station as part of voice call handoff procedures insures that the mobile station can determine if, as a consequence of the handoff, it has traversed any packet zone boundaries. Receipt of the PZID ensures that the mobile station can properly re-activate any dormant packet data session it might have subsequent to the handoff, and permits updating the connection to the PDSN. As noted earlier, proper packet data routing between the network and the mobile station depends on the mobile station having knowledge of the correct PZID.

In general, however, a mobile station undergoing voice call hard handoff between base stations supporting concurrent services receives updated NID, SID, and PZID values for the target (receiving) base station as part of the handoff procedure. Thus, when the mobile station is handed off from a source base station to the target base station while engaged in an active voice call, it typically receives updated NID, SID, and PZID values from the target base station as part of the ISTP message.

The mobile station updates its stored NID, SID, and PZID parameters based on the values received in the ISTP message, which action can delay re-registration of the mobile station at the conclusion of the voice call. For example, after termination of the active voice call, the mobile station again begins monitoring one or more overhead channels for identification parameter information. If the mobile station has remained in the service area of the target base station, its stored parameters will match those it obtains on the overhead channel.

Because of the matching NID/SID information, the mobile station does not recognize that it has moved from source base station to target base station and therefore does not re-register with the network. Where the movement was inter-system (i.e., between MSCs), this failure to re-register leaves the HLR with inaccurate location information for the mobile station. Such inaccurate information interferes with the network's ability to direct mobile-terminated voice calls to the mobile station. That is, by not re-registering, the HLR information for the mobile is not updated and subsequent mobile-terminated calls will not be properly routed, or at least will not be efficiently routed.

BRIEF SUMMARY OF THE INVENTION

A wireless communication network selectively transmits "dummy" or false network identification information to ensure that a mobile station engaged in an active voice call and that undergoes a handoff between base stations and mobile switching centers that support concurrent services timely and reliably re-registers with the network. Such re-registration by the mobile station ensures that Home Location Register (HLR) or similar voice call routing information is timely updated to reflect movement of the mobile station. Examples of concurrent services networks where the present invention may be advantageously practiced include but are not limited to IS-2000 networks and 1xEV-DV networks.

In an exemplary embodiment, a target base station receives a mobile station in handoff from a source base station, while the mobile station is engaged in an active voice call. The target base station sends a dummy value for one or both the Network Identifier (NID) and the System Identifier (SID) to the mobile station, but preferably sends actual (true) PZID information. Thus, the mobile station receives false NID and/or SID information while the voice call is still active, but receives accurate PZID information so that it can properly re-activate any dormant packet data connection it might have. After concluding the voice call, the mobile station begins monitoring one or more overhead channels on which the target base station broadcasts true network identification parameters. Thus, the mobile station obtains the target base station's true NID/SID values after the call ends and recognizes the mismatch between these true values and the earlier received false value(s). The mobile station re-registers on the voice side of the network (circuit-switched re-registration) responsive to recognizing the mismatch, thereby ensuring that HLR information for the mobile station is properly updated.

In another exemplary embodiment, the target base station provides a dummy Packet Zone Identifier (PZID) to the mobile station as part of receiving it during handoff. In this scenario, the target base station generally provides actual SID and NID values along with the dummy PZID. Receipt of the PZID, whether dummy or not, causes the mobile station, if it has a dormant packet data session, to generate an Enhanced Origination Message (EOM), and transmit this message to the network. The mobile station will have previously stored the prior PZID associated with the source base station, and it includes this prior PZID information in its EOM. Receipt of the prior PZID at the target base station causes it to forward the mobile station's prior PZID value and current, actual PZID information to a Packet Data Serving Node (PDSN) or other routing entity so that packet data routing information for the mobile station may be properly updated.

If the mobile station is still within the service area of the target base station at the conclusion of the voice call, it will obtain the actual rather than the dummy PZID of the target base station via the mobile station's monitoring of the overhead channel(s). Responsive to receiving the actual PZID, the mobile station generates an Origination Message (OM) based on the mismatch between the dummy and actual PZIDs. This time, however, the base station recognizes that the mobile station is simply responding to its earlier receipt of dummy information based on recognizing that the OM contains the dummy PZID value earlier sent by the target base station to the mobile station. As such, the base station suppresses PDSN signaling because there is no need to update packet data routing for the mobile station. However, with receipt of OMs, the target base station triggers re-registration of the mobile station with the associated HLR, even where packet data re-registration is suppressed.

In its various exemplary embodiments, the present invention finds applicability in a variety of networks that support concurrent services handoff and employ similar parameter-driven re-registration. That is, the present invention might be used in any type of wireless communication network where identification parameters are used to facilitate re-registration of mobile terminals. Further, it should be noted that the various inventive features of the present invention can be, in the various embodiments, be implemented in one or more network entities. For example, in some embodiments the intelligence regarding dummy parameter generation and handling generally resides in the MSCs, while in other embodiments, the base stations assume a principal role. In still other variations, the MSCs and base stations cooperate in implementing such functionality.

DETAILED DESCRIPTION OF THE INVENTION

Figure 1:
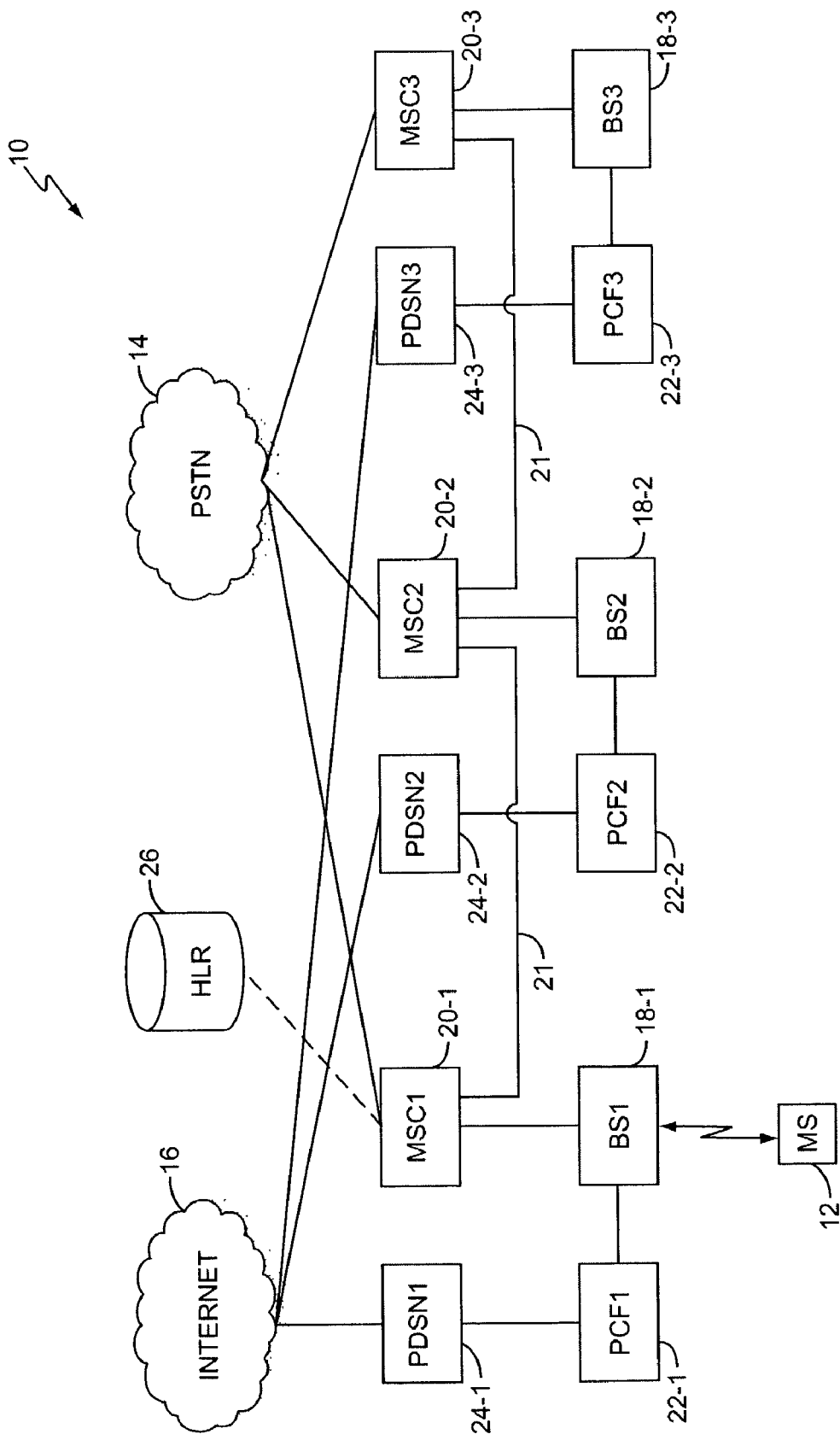
FIG. 1 is a diagram of an exemplary communication network for practicing the present invention.

While the following discussion focuses on IS-2000 and related networks, such as 1xEV-DV networks, offering concurrent circuit-switched and packet-switched services, it should be understood that the present invention is not limited to the particular embodiments described, nor to those particular network standards. With that qualification in mind, FIG. 1 illustrates an exemplary wireless communication network generally referred to by the numeral 10, and which may be configured in accordance with IS-2000 standards in general, and with 1xEV-DV standards in particular. For background information, the reader is referred to the Telecommunication Industry Association (TIA) and Electronic Industry Association (EIA) standards for such networks. Relevant documents include "Interoperability Specification (IOS) for CDMA 2000 Access Network Interfaces TIA/EIA/IS-2001-A.

It should be understood that FIG. 1 simplifies certain network details for clarity, and that in actual implementation network 10 is typically more complicated, and generally includes additional network entities. However, the illustration of such complications is not necessary for understanding the present invention. As a basis for discussing and understanding the present invention, the exemplary network 10 comprises base stations (BSs) 18, mobile switching centers (MSCs) 20, packet control functions (PCFs) 22, and packet data serving nodes (PDSNs) 24, and at least one home location register (HLR) 26. Where a plurality of like entities is illustrated, individual entities are distinguished as "–1", "–2" and so on. For example, BSs 18 may be individually denoted as BS 18-1, 18-2, etc.

Network 10 communicatively couples one or more mobile stations (MSs) 12 with various other networks, including circuit-switched voice and data networks 14, such as the Public Switched Telephone System (PSTN), and packet-switched public data networks 16, such as the Internet. Thus, network 10 routes traditional circuit-switched data between MSs 12 and the PSTN 14 using MSCs 10 and BSs 18, and packet-switched data between MSs 12 and the Internet 16 using PDSNs 24, PCFs 22, and BSs 18.

Because of the architectural and entity-naming differences that exist between the different wireless network standards, and between the different equipment vendors, those skilled in the art will appreciate that the entities illustrated in FIG. 1 are exemplary and should be broadly construed. As an example, BSs 18 might comprise any one of several different arrangements of control and interface entities, as well as radio frequency (RF) transceiver resources. Thus, BSs 18 should be understood to include, in at least some embodiments, the PCF/MSC interface and control circuitry, as well as one or more Radio Base Stations (RBSs) and their associated timing and control circuitry. Thus, the term "BS" as used herein should be construed broadly to generally cover essentially any type of base station system (RSS) or architecture.

Regardless of the specific network implementation details, one of the challenges of mobile communication is to track the MS 12 as it moves within the network 10 to insure proper routing of data to and from the MS 12. Where different network entities are involved in the support of circuit-switched traffic versus packet-data traffic, mobility management generally involves tracking from the perspective of voice-based services, and tracking from the perspective of packet-based services. That is, the geographic and system boundaries may be different for circuit-switched services (i.e., voice/fax) as compared to packet data services.

The HLR 26, as part of the "home network" associated with the MS 12, supports mobility management by maintaining location information for the MS 12. As the MS 12 moves within the network 10, this location information may be updated to reflect the MS's current service location. More specifically, the HLR 26 generally is updated to reflect movement of the MS 12 between MSCs 20, so that an incoming voice call (i.e., a mobile-terminated call) may be routed to the appropriate MSC 20. From there, mobility management functions at the MSC/BSC level then ensure that the call is routed to the appropriate BS 18 for radio communication with the MS 12. Here, network 10 might encompass several different networks operated by differing system vendors.

As an example of inter-MSC movement, assume that MS 12 initially registers with MSC 20-1 (MSC1), which, in an exemplary network architecture, causes MSC1 to invoke an IS-41 registration with HLR 26 such that HLR 26 updates location information for the registering MS 12. When the MS 12 moves from MSC1 to MSC 20-2 (MSC2), or any other MSC 20, the information needed to complete this handoff generally is transferred from a source BS 18 to a target BS 18.

However, some handoff/movement scenarios exist in certain kinds of networks offering concurrent services where the MS 12 does not timely re-register subsequent to handoff. For example, in IS-2000-based networks, a MS 12 that undergoes an inter-MSC hard handoff between concurrent services BSs 18 while engaged in an active voice call may not timely re-register at the conclusion of the voice call, thereby leaving the associated HLR location information out-of-date, which leads to inefficient or failed routing of subsequent mobile-terminated voice calls. This potential failure arises because concurrent services BSs 18 generally assume that the MS 12 might have a dormant packet data connection and thus provide updated network identification information to MS 12 as part of handoff, or subsequent to such handoff.

Figure 2:
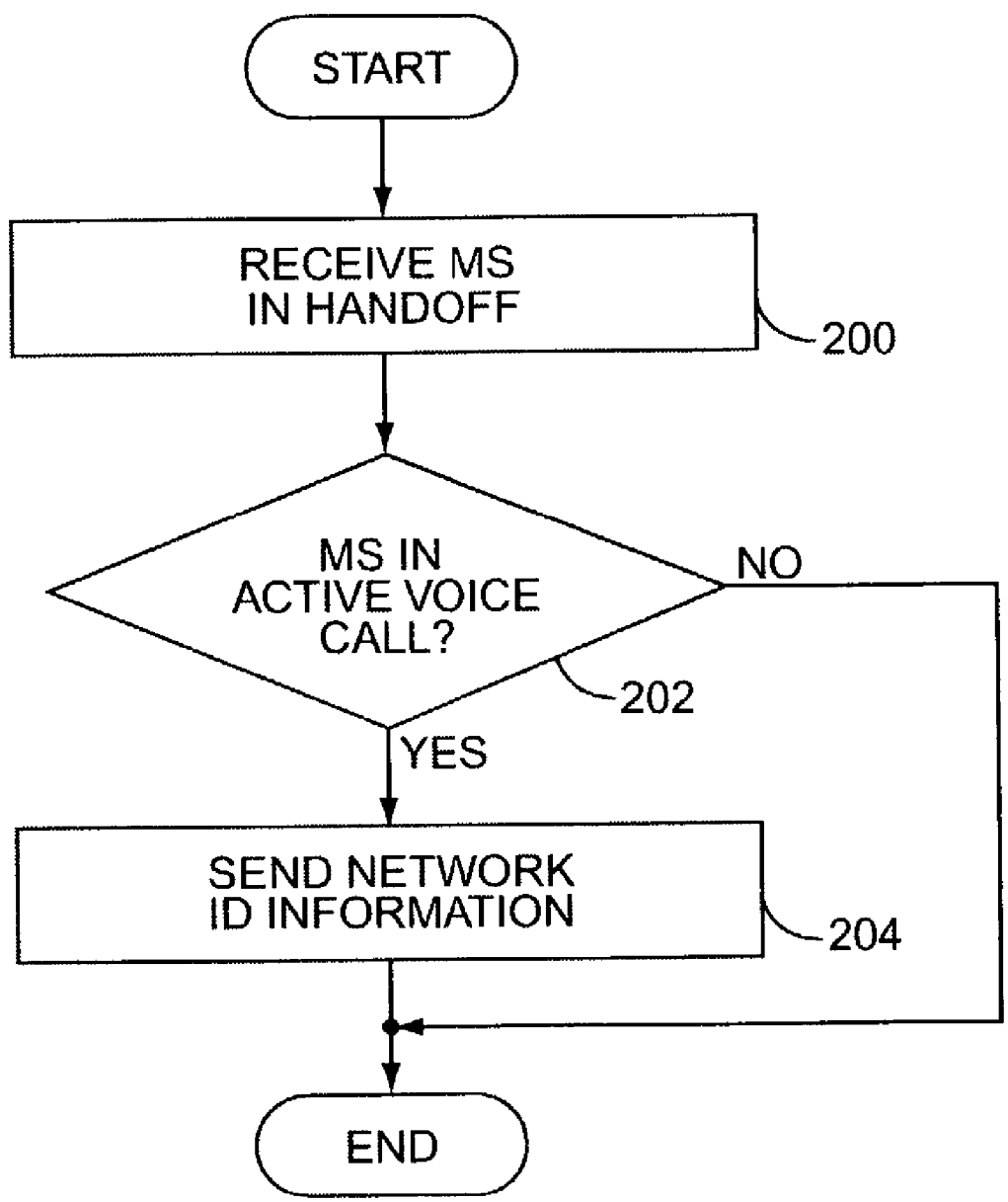
FIG. 2 is a diagram of conventional hard handoff operations between base stations supporting concurrent services.

FIG. 2 illustrates conventional handoff operation and provides a better basis for understanding the possibility for re-registration failure. In a conventional hard handoff of MS 12, processing begins with the target BS 18 receiving MS 12 in handoff from the source BS 18 (Step 200). If MS 12 is engaged in an active voice call (Step 202), the target BS 18 sends updated network information to MS 12 (Step 204), generally in the form of an In-System Traffic Parameters (ISTP) message, which is received by MS 12 during the voice call. The impetus for sending the network information is to ensure that connection information for any dormant packet data connection that MS 12 might have is properly updated.

If MS 12 is not engaged in an active voice call (Step 202), the network handles handoff according to existing packet data handoff procedures. Exemplary information regarding such handoff procedures may be found in the co-pending U.S. patent application Ser. No. 10/007,586, entitled "Optimization of Circuit Call Setup and Delivery Associated with Inter-MSC Packet Data Handoff," and which is hereby incorporated in its entirety by reference herein.

Note that the possibility of timely re-registration failure outlined in FIG. 2 is principally of concern where MS 12 has undergone an inter-MSC hard handoff. That is, if the source and target BSs 18 are associated with the same MSC 20, the HLR information for MS 12 usually does not need updating, since the MSC 20 supporting MS 12 does not change. With inter-MSC handoff, however, the HLR information for MS 12 should be updated to reflect movement of MS 12 from the old MSC 20 to the new MSC 20.

Figure 3:
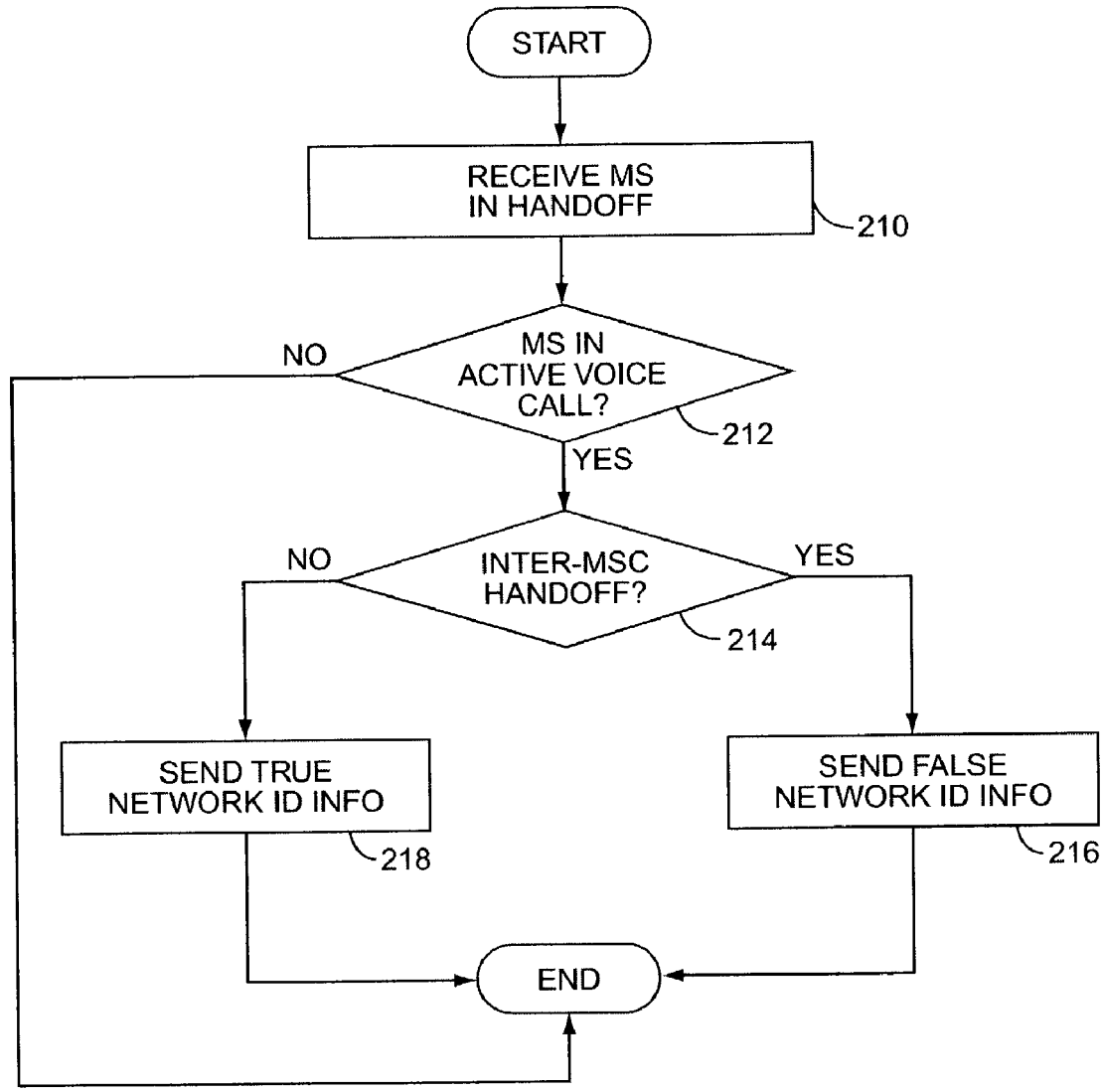
FIG. 3 is a diagram of exemplary flow logic for one embodiment of dummy parameter generation and handling.

FIG. 3 introduces exemplary handoff processing in accordance with one embodiment of the present invention. Here, it is assumed that the MS 12 stores network identification information received from a target BS 18 in association with hard handoff processing. Based on the storage of such false information, the MS 12 will recognize the disparity between the false information received in association with handoff and the true information broadcast by the target BS 18 on its overhead channel(s), which the MS 12 begins monitoring at the conclusion of its active voice call. Sending such false information in association with hard handoff ensures the subsequent mismatch between the false and true information, and thereby forces re-registration by MS 12.

In the illustrated logic, BSs 18 generally handle generation and transmission of dummy network information as appropriate. Processing begins with a target BS 18 receiving MS 12 in handoff from a source BS 18 (Step 210). If MS 12 is not engaged in an active voice call (Step 212), the inventive processing generally ends with the handoff being handled according to standardized packet data handoff procedures (see Step 206 of FIG. 2). However, if MS 12 is engaged in an active voice call (Step 212), the target BS 18 determines whether the handoff is an inter-MSC hard handoff (Step 214). If not, the handoff is between source and target BSs 18 operating under control of a common MSC 20, and the target BS 18 sends true network identification information (Step 218).

If, however, the handoff is a hard handoff, the target BS 18 sends false, i.e., "dummy," network identification information to the MS 12 (Step 216). More particularly, the target BS 18 sends false values for one or both the NID and SID, but preferably sends true PZID information to MS 12. For example, the target BS 18 might send an "In System Traffic Parameters" (ISTP) message to MS 12, and then continue with its other processing. With ISTP messaging, the network 10 sends the identification parameters using either a dedicated control channel associated with the voice call, or sends the information as part of the voice traffic using, for example, dim-and-burst signaling. In dim-and-burst signaling, a portion of the voice data in selected voice frames transmitted to the MS 12 is replaced by signaling data that includes the network identification information. Alternatives to dim-and-burst signaling include blank-and-burst signaling wherein selected voice frames are replaced by signaling data. Of course, it should be understood that the network 10 might use dedicated control channel signaling, or essentially any other available signaling mechanism to transfer the network identification information to MS 12.

As was noted earlier, convention network operation is based on the target base station sending actual network identification information under all circumstances. Thus, where that base station receives a mobile station in hard handoff during an active voice call, the mobile's stored network identification information is updated with true network identifiers corresponding to the target base station. Thus, at the conclusion of the voice call, the true identification information received by the mobile station based on its monitoring of the target base station's overhead channel(s) matches that already stored by the mobile station. Without any mismatch of information, the mobile station does not recognize that it has been handed off during the prior voice call and therefore fails to re-register on the voice side of the network, i.e., the HLR 26 is not updated to reflect the hard handoff that occurred during the voice call.

Figure 4:
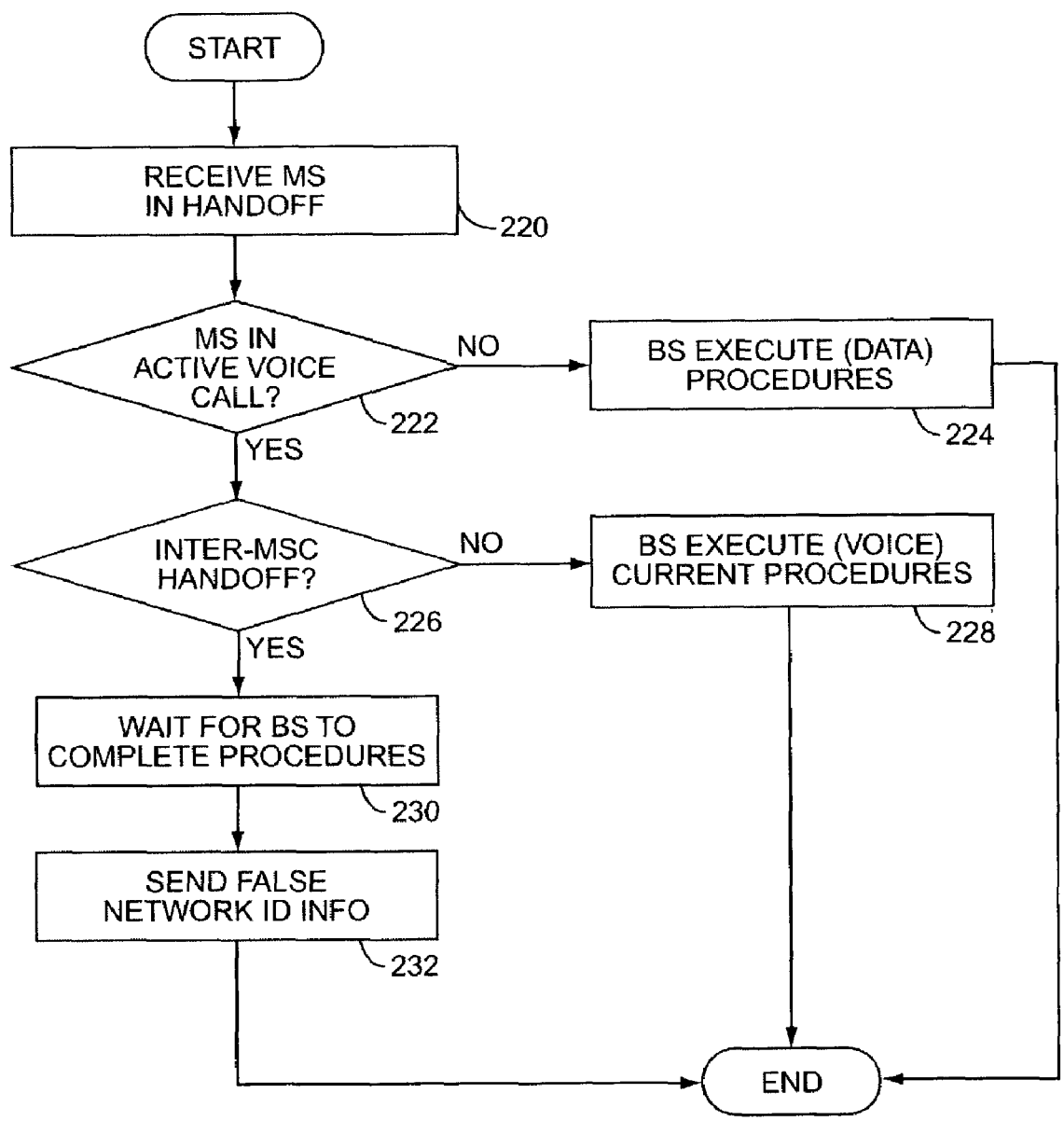
FIG. 4 is a diagram of exemplary flow logic for another embodiment of dummy parameter generation and handling.

FIG. 4 illustrates another exemplary embodiment of the present invention in which MSCs 20 generate or otherwise manage false network information for use in hard handoff operations. Message flow in such handoffs is from source BS 18 to target MSC 20, and from target MSC 20 to target BS 18. Thus, processing begins with a target MSC 20 receiving a handoff request for MS 12 from a source BS 18 (Step 220). If the MS 12 is not engaged in an active voice call, handoff is performed using established packet-data handoff procedures (Step 224). However, if the MS 12 is engaged in an active voice call (Step 222), the target MSC 20 determines whether the handoff is an inter-MSC hard handoff (i.e., a handoff between base stations controlled by different MSCs 20). Such information is readily determined by the MSC 20 based on its determination of whether the handoff request was received via IS-41 messages.

If the handoff is not a hard handoff (Step 226), the target MSC 20 instructs the target BS 18 to execute established voice handoff procedures (Step 228), which may be similar to those procedures indicated in Step 218 of FIG. 3. If, however, the handoff is a hard handoff (Step 226), the target MSC 20 first instructs the target BS and then waits for the target BS 18 to complete handoff procedures (Step 230), which might be similar to those operations performed in Step 228. Target MSC 20 then causes the target BS 18 to send false network identification information (Step 232) to MS 12.

In this particular embodiment, the false information preferably includes false NID and/or SID information but generally does not include the transmission of PZID information, false or otherwise. The MSC 20 may use an established messaging procedure to transmit the false information to MS 12, such as by using the MS Registered message defined in the IS-2000 standards. Thus, the MSC 20 may use an existing message type to convey the false information but it should be understood that new messages might be defined for such operations.

Figure 5:
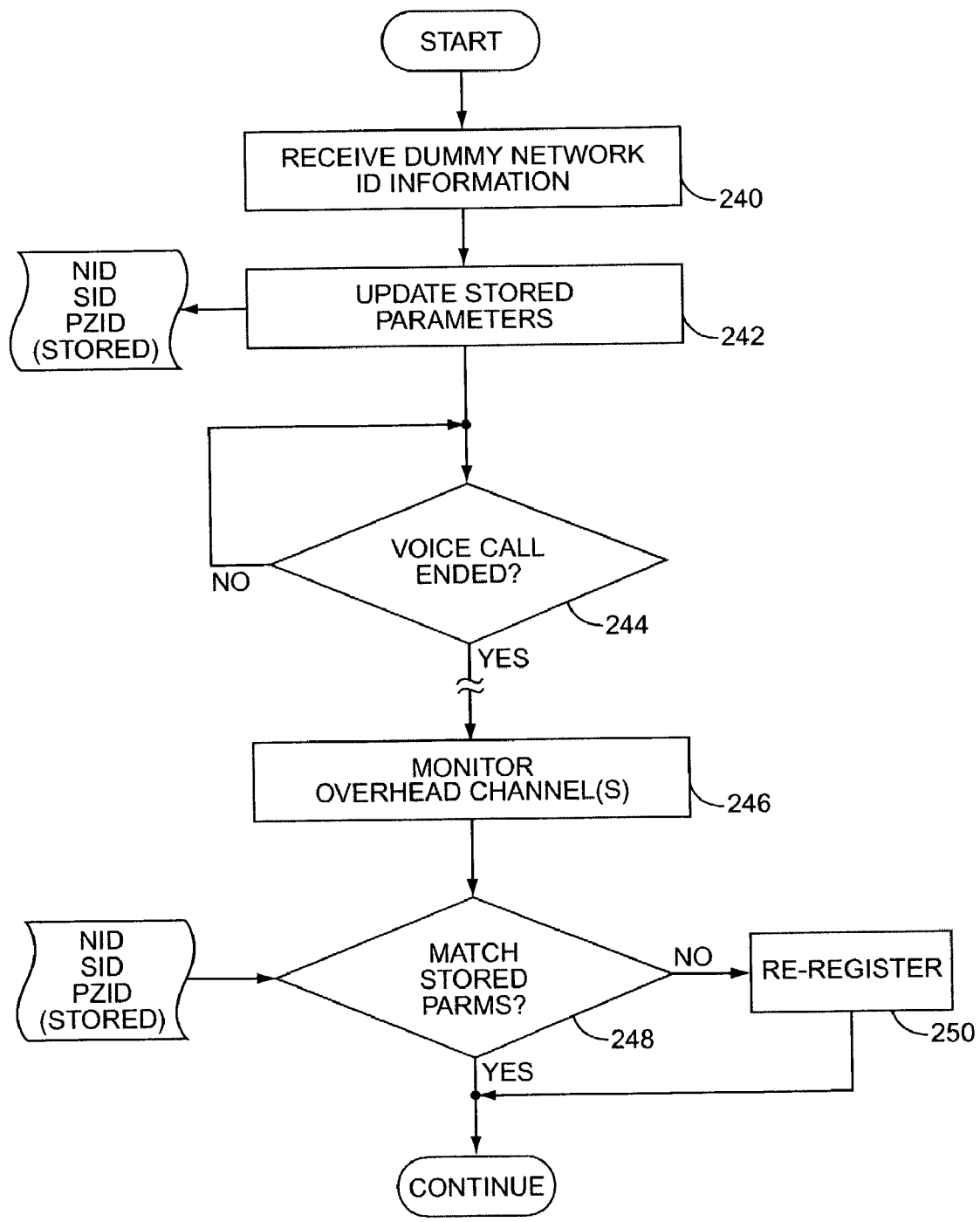
FIG. 5 is a diagram of exemplary re-registration and messaging logic for a mobile station.

FIG. 5 illustrates exemplary flow logic for MS 12 as regards handoff and the receipt of false network information in an exemplary embodiment where false (dummy) NID and/or SID values are sent to the MS 12. Processing begins with the assumption that MS 12 is engaged in an active voice call and has just undergone a hard handoff from a source BS 18 to a target BS 18. MS 12 receives false network identification information from target BS 18 in an ISTP message or by other available means (Step 240). MS 12 updates its stored parameters based on the received information, which information might include false NID/SID values but preferably includes true PZID values (Step 242).

After updating, MS 12 continues operations as needed, including the reactivation of any dormant packet data service instances if warranted (i.e. if a packet zone boundary has been traversed) while checking for termination of the voice call (Step 244). Once the call terminates, MS 12 resumes monitoring the one or more overhead channels broadcast by the target BS 18 (Step 246). Through such monitoring, MS 12 obtains the true network information for the target BS 18 and compares this information to the stored identification information (Step 248). If the stored information, i.e., the dummy information received from the target BS 18 during the voice-call handoff, does not match the information obtained on the overhead channels, MS 12 re-registers (Step 250) with network 10, thereby causing the corresponding HLR information to be properly updated.

The above logic assumed that MS 12 retains the network identification parameters it receives from the target BS during the active voice call such that they are available for comparison with the identification information obtained by monitoring the overhead channel(s) after termination of the voice call. In some instances, however, the MS's operating logic may be such that NID/SID information is not retained at the end of the voice call. That is, MS 12 might be programmed to flush the NID/SID information received in an ISTP message during the voice call and replace such information with that obtained via the overhead channel(s) after the voice call ends.

Figure 6A:
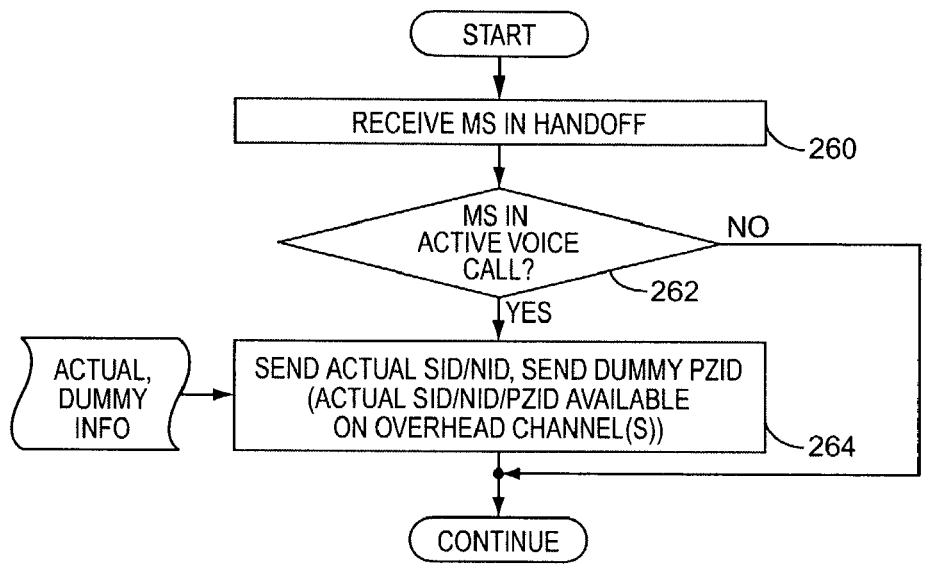
FIG. 6 is a diagram of exemplary dummy parameter handling at a base station.

FIG. 6A illustrates an exemplary alternate embodiment that addresses such mobile station operation. Here, the overall approach involves sending dummy PZID information rather than dummy NID/SID information. Processing begins with the target BS 18 receiving MS 12 in hard handoff from the source BS 18 (Step 260). The target BS 18 determines if MS 12 is engaged in an active voice call (Step 262). If so, the target BS 18 preferably sends true SID/NID values and a dummy PZID value to MS 12 via, for example, an ISTP message (Step 264). If MS 12 is not engaged in an active voice call (Step 262), Step 264 is bypassed, i.e., false information is not transmitted to MS 12.

Figure 6B:
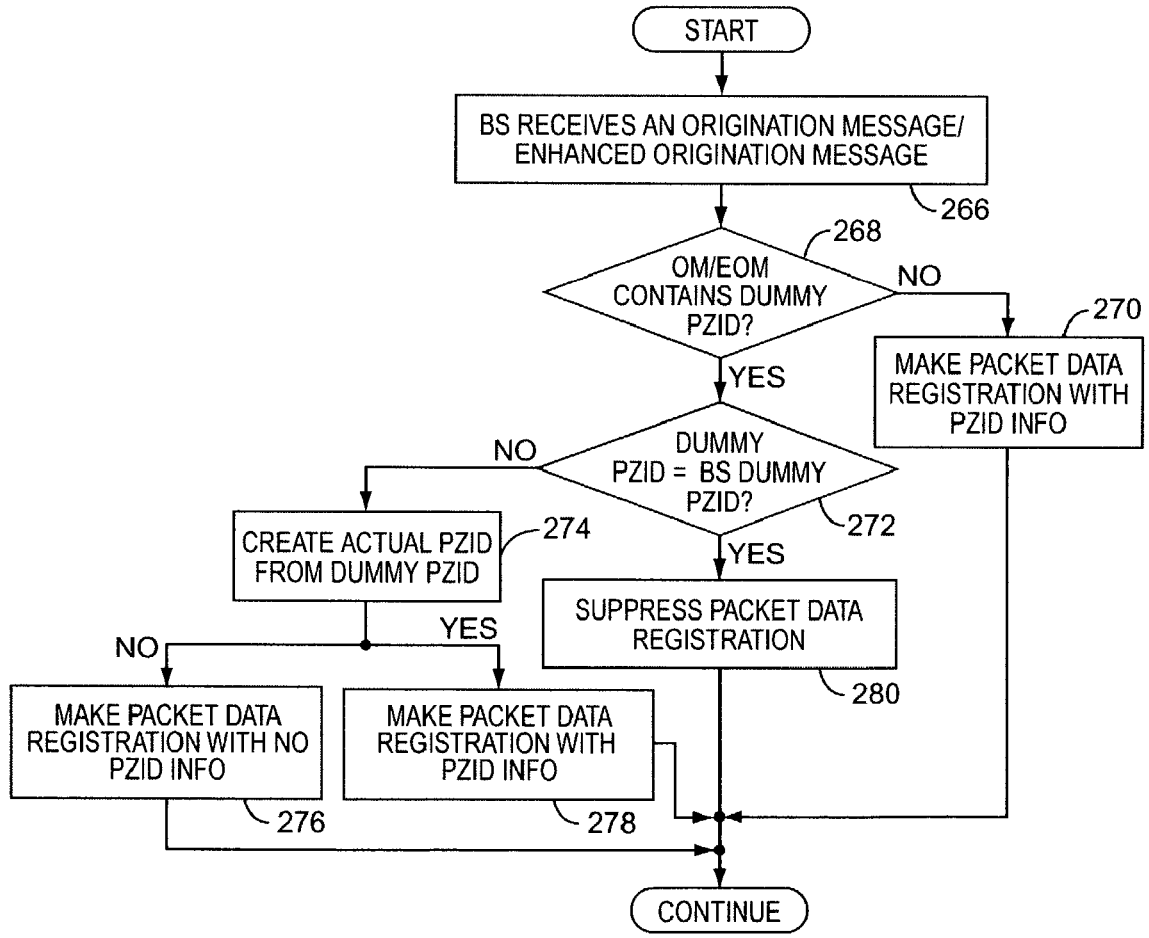

While FIG. 6A illustrates when dummy PZID information is sent to MSs 12, FIG. 6B illustrates network processing of such dummy information in the context of registering or re-registering MSs 12 on the packet data side of network 10, i.e., updating packet data connection information for MSs 12 as regards supporting packet data router(s). Supporting packet data routing entities may include supporting PCFs 22 and PDSNs 24. Generally, any time a MS 12 receives new PZID information from network 10, it generates some type of origination message in response. Here, "new" connotes PZID information that does not match the PZID information currently stored by MS 12. These origination messages generally include the prior (stored) PZID of the MS 12. According to the present invention, network 10 may or may not update the mobile station's packet data registration depending upon the contents of the specific origination message received.

More particularly, in embodiments where network 10 provides dummy PZID information to MSs 12 undergoing hard handoff while engaged in active voice calls, MSs 12 may generate either an Enhanced Origination Message (EOM) or a non-enhanced Origination Message (OM). The circumstances under which each message type is generated, and the contents of such messages is given below:

- MS 12 receives new (dummy) PZID information as part of ISTP message after hard handoff during an active voice call: here, MS 12 generates an EOM and includes its prior (stored) PZID information in that message, which information generally is the PZID of the source BS 18 that handed MS 12 off to the target BS 18 but may be dummy PZID information associated with being handed off multiple times during a voice call;
- MS 12 receives new (actual) PZID information obtained by its monitoring of the target BS's overhead channel(s) at the post-handoff conclusion of its active voice call: here, MS 12 generates an OM and includes its prior (stored) PZID information in that message, which information generally is the dummy PZID information that caused MS 12 to earlier transmit the EOM explained above;
- MS 12 receives new (actual) PZID information as part of undergoing a non-voice packet data handoff from source BS 18 to target BS 18 or in the embodiments involving inter-MSC voice calls, the target BS 18 sends an ISTP message with a dummy SID and/or NID and the actual PZID associated with the target BS; here, MS 12 generates an EOM and includes its prior (stored) PZID information in that message, which information generally is the actual PZID of the source BS 18 that handed it off.

Thus, in embodiments of the present invention where dummy PZID information rather than dummy NID/SID is used to force mobile station re-registration, network 10 must be able to differentiate between EOMs and OMs received from MSs 12, and further determine whether such messages contain true or false PZID information. FIG. 6B illustrates exemplary network operation in this context.

In the figure, processing begins with a given BS 18 receiving either an OM or an EOM from a given MS 12 (Step 266). MS 12 may or may not have undergone a prior active voice call hard handoff to BS 18. In any case, BS 18 processes the message to determine whether it contains dummy PZID information (Step 268). As detailed above, the received message might contain dummy PZID information for a variety of reasons. If the message contains actual rather than dummy PZID information, BS 18 transfers the received PZID information to its supporting PCF 22/PDSN 24, thereby initiating packet re-registration of MS 12 (Step 270). Such packet data registration may not trigger IS-41 registration with the HLR 26, such that location information for MS 12 in HLR 26 is not updated to reflect the mobility event.

If, however, the received message does contain dummy PZID information (Step 268), BS 18 determines whether the dummy information matches the dummy PZID information associated with BS 18. That is, BS 18 determines whether the MS 12 received the dummy information from it or from another BS 18 as might occur in a multiple handoff scenario (Step 272). If the dummy PZID information does not match that used by BS 18, the BS 18 determines whether it can derive a valid PZID from the dummy information (Step 274). Thus, where network 10 generates dummy PZID values by applying some coding or algorithm scheme to actual PZIDs, a dummy PZID so formed may be converted back to an actual PZID by applying the reverse process.

If BS 18 successfully derives a valid PZID from the non-matching dummy information, it initiates packet data re-registration using the derived valid PZID (Step 276). If not, it initiates packet data re-registration without benefit of sending prior PZID information to its supporting PCF 22 and PDSN 24. In either case, processing continues as needed subsequent to packet data re-registration.

If the dummy information received from MS 12 matches the dummy PZID used by the BS 18 (Step 272), BS 18 suppresses packet data re-registration of MS 12 and avoids propagating dummy PZID information upward in network 10, i.e., does not send dummy information to the supporting PCF 22/PDSN 24. BS 18 suppresses packet data re-registration in this case because receipt of its own dummy PZID information from MS 12 indicates that MS 12 is performing forced re-registration at the conclusion of a voice call during which MS 12 underwent a hard handoff to the current BS 18. As such, BS 18 already initiated a packet data re-registration of MS 12 responsive to receiving the earlier EOM from MS 12, which EOM was caused by BS 18 providing dummy PZID information to MS 12 as part of the inventive hard handoff processing. However, upon receipt of the OM, the BS 18 shall send this indication to its supporting MSC 20, which causes re-registration of MS 12 with HLR 26 on the voice side (circuit-switched side) of the network 10. Thus, the OM from MS 12 may be suppressed with regard to packet data re-registration, yet still trigger the BS 18 to initiate re-registration of MS 12 on the voice side of the network 10.

Figure 7:
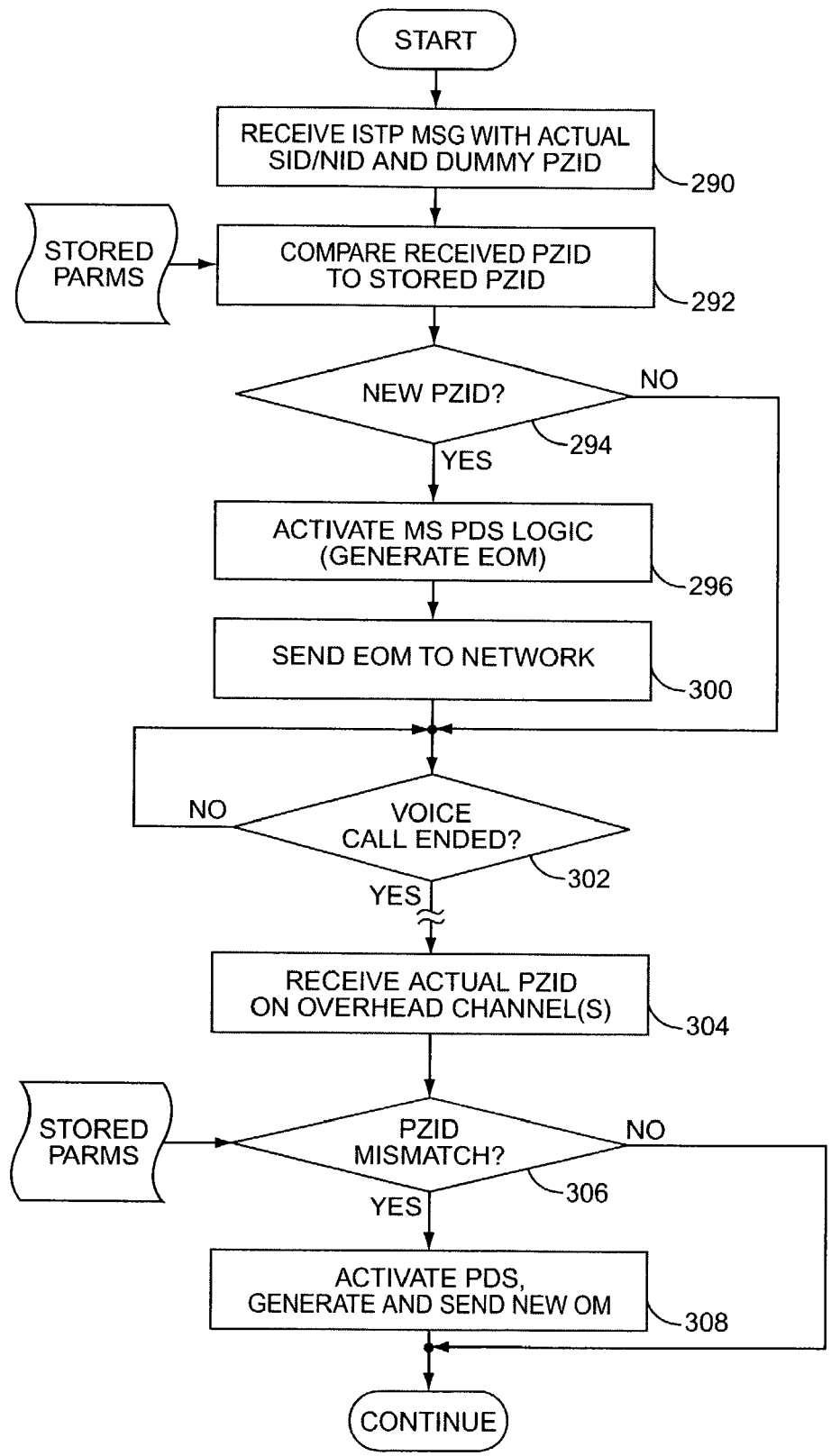
FIG. 7 is a diagram of exemplary mobile station operations in association with dummy parameter handling.

FIG. 7 illustrates exemplary mobile station logic corresponding to the above use of dummy PZIDs. Processing begins with the MS 12 being handed off in an active voice call from the source BS 18 to the target BS 18 referenced in the above discussion of FIGS. 6A and 6B.

As part of the handoff processing, MS 12 receives the ISTP message or like message from the target BS 18, which message includes true NID/SID values and a dummy PZID value (Step 290). MS 12 compares the received PZID to its stored (prior) PZID (Step 292) to determine whether the newly received PZID is different (Step 294). If the new PZID differs from the prior PZID, MS 12 activates its packet data session (PDS) logic, or otherwise enables the logical processing portion responsible for packet data operations. Based on recognizing the difference between the previous (stored) PZID and the newly received PZID, MS 12 generates an EOM (Step 296) for each dormant packet data instance and transmits this message to network 10 (Step 300). As noted above in reference to base station operations, the EOM generated by MS 12 generally includes the prior PZID rather than the dummy PZID just received, thus the target BS 18 receives the EOM and re-registers MS 12 on the packet side of network 10. Of course, if the newly received PZID is not new (different) from its stored (prior) PZID, MS 12 does not transmit an EOM (Step 294).

While it should be understood that MS 12 continues performing other operations as needed, for purposes of detailing dummy PZID processing operations, MS 12 at this point monitors for the end of the active voice call (Step 302). Once that call ends, MS 12 resumes monitoring the target BS's overhead channel(s) and thus obtains true PZID information from the target BS 18 (Step 304). MS 12 compares the PZID thus obtained with its stored PZID, i.e., the dummy PZID received in association with the earlier hard handoff, recognizes the mismatch (Step 306), and transmits an OM to the target BS 18 (Step 308). This OM includes the prior (stored) dummy PZID, and is processed at the target BS 18 in exemplary fashion as described in the discussion for FIG. 6B above.

The above exemplary details set forth various methods of ensuring (forcing) timely re-registration of MSs 12 that undergo hard handoff between base stations supporting concurrent services while engaged in active voice calls. In general terms, the approach involves the transmission of one or more dummy network identification parameters to a given MS 12 in association with the handoff. The receipt of the dummy information by MS 12 ensures that, at the end of the active voice call, a network identification parameter mismatch will arise based on MS 12 obtaining true network identification from its monitoring of one or more overhead channels carrying such information.

In one or more exemplary embodiments, the target BS 18 transmits dummy NID and/or SID values to MS 12 using an ISTP message in association with receiving MS 12 in hard handoff. If MS 12 is programmed to retain these received SID and/or NID values beyond conclusion of the voice call, it will recognize the mismatch between the dummy information and the true information obtained by its overhead channel monitoring, which resumes after the voice call ends. However, some types of MSs 12 may be programmed to clear or otherwise erase NID/SID information received handoff while engaged in an active call.

In such cases, or simply as an alternative to using dummy SID/NID values, alternate exemplary embodiments of the present invention transmit true SID/NID values but transmit dummy PZID values in association with active voice call hard handoffs. With this approach, re-registration is ensured based on the false PZID value forcing the MS 12 (1) to transmit an EOM responsive to receiving the false PZID while its voice call is active, and (2) to transmit an OM responsive to receiving true PZID information at the conclusion of the call. Of course any of the possible permutations of true/false NID/SID/PZID values may be transmitted by network 10 as appropriate or desired.

The network 10 and/or MS 12 might adopt a time-based approach to re-registration such that MS 12 re-registers with the network 10 some defined time after conclusion of an active voice call to ensure proper routing of subsequent incoming traffic for MS 12. However, even where such time-based registration is used, the methods of the present invention offer advantages in terms of more quickly forcing MS 12 to re-register under such circumstances.

More specifically, transmitting dummy network identification information from network 10 as part of, or in association with, the voice-call handoff process ensures that MS 12 recognizes an identification parameter mismatch at or shortly after it resumes monitoring the overhead channel(s) of the target BS 18 at the conclusion of the active voice call. Thus, transmission of the dummy information reduces the period of post-handoff time during which the HLR 26 holds outdated location information for MS 12.

In various above embodiments, it was noted that BSs 18 transmitted dummy PZID information ($PZID_D$). To facilitate reliable operation in this scenario, each BS 18 should include or have assigned a unique value for its dummy $PZID_D$. That is, the $PZID_D$ value used for BS1 should generally be different from the $PZID_D$ value used for BS2, and so on. Of course, the present invention can be adapted to use common dummy $PZID_D$ values, but, in all cases, the dummy $PZID_D$ values should be such that they are reliably recognized as dummy values to avoid propagating Origination Messages that include false PZID values.

In one approach, true PZIDs might be formed as n-bit values with the Most Significant Bit (MSB) cleared (or set), and false PZIDs might be formed as n-bit values with the MSB set (or cleared). Thus, in an eight-bit example, BS1's true PZID might be 00010110 and its false PZID could then be conveniently formed by simply inverting the MSB to yield 10010110. In this example, then, the range of "1xxxxxxx" is blocked from use for as valid PZID values.

Thus, in the earlier discussion of base station operations, a given BS 18 that receives a false PZID value as part of an OM or EOM could readily determine whether a true value can be derived from that false value. Of course, other algorithms might be employed by the network to convert between true and false PZID values, and BSs 18 receiving messages from MSs 12 containing false PZIDs could simply perform the reverse algorithm on such PZIDs to determine whether they were formed from true PZIDs valid within network 10.

Figure 8:
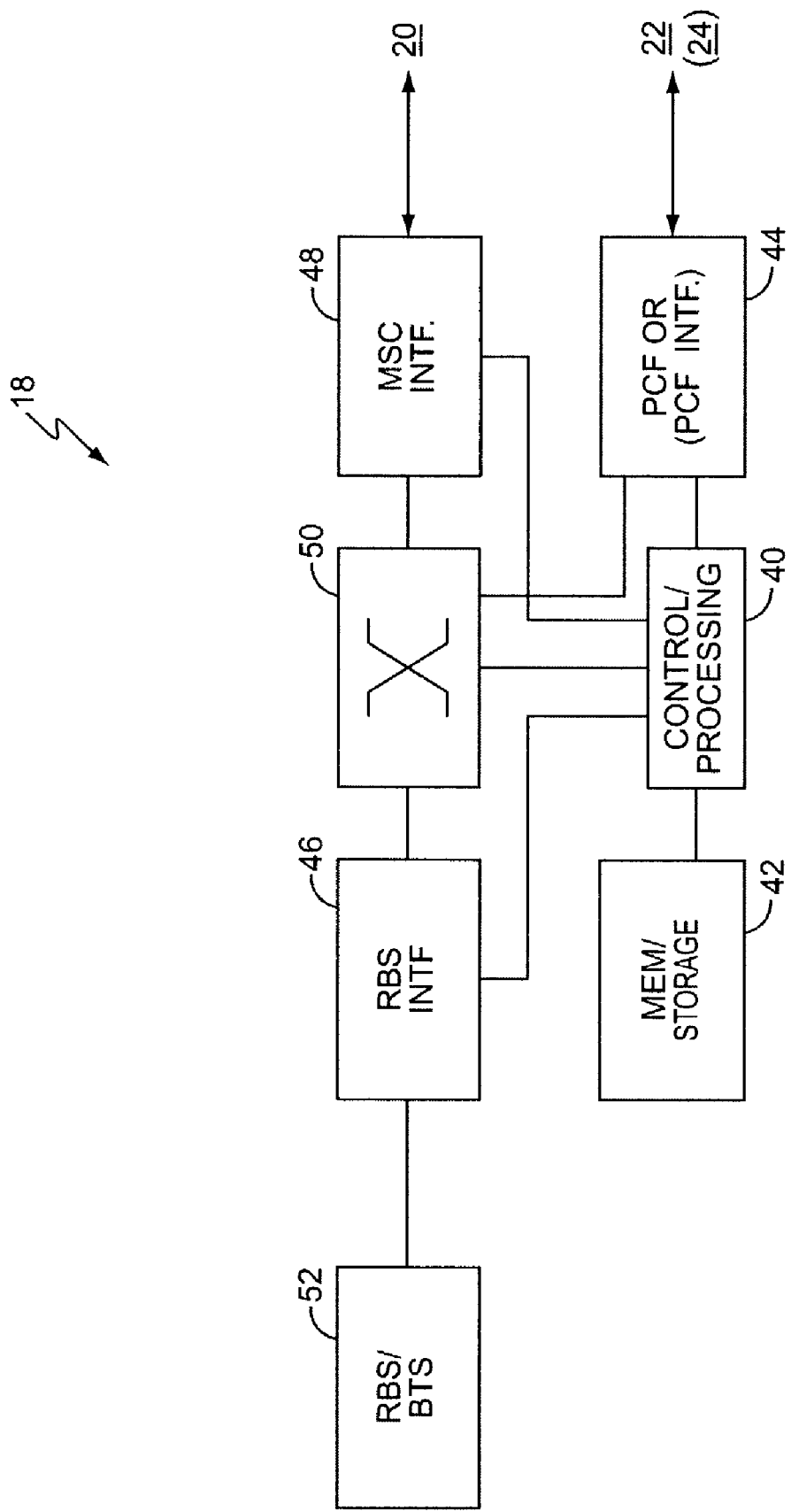
FIG. 8 is a diagram of an exemplary base station as might be used in the network of FIG. 1.

FIG. 8 illustrates an exemplary functional architecture for BSs 18. The exemplary BS 18 comprises a control/processing system 40, memory/storage 42, a PCF 22 or a PCF interface 24 for communicating with PCF 22, an RBS interface 46, an MSC interface 48, switching resources 50, and RBS/BTS resources 52. Those skilled in the art will appreciate the wide variations in BS implementation details, and thus will understand that the illustrated functional layout may be varied while still providing support for the present invention.

In operation, the control/processing system 40 provides overall base station control, and manages the various communication interfaces to support communication and control functions involving the associated RBSs 52, MSC 20, and PCF 22. Memory/storage 42 may be used to store computer software or other logical instructions supporting practice of the present invention in any of its various embodiments. As such, memory/storage 42 may be used to hold program instructions supporting the above-illustrated exemplary base station operations involving the transfer of dummy identification information to the MS 12, and in suppressing/passing OMs or EOMs from MSs 12 based on recognition of dummy PZID values in such messages.

Packet data received from or through PCF 22 is routed through switching resources 50, and typically is converted or re-packaged according to a Radio Link Protocol (RLP), for wireless transmission to the MSs 12 via RBSs 52. Similarly, circuit-switched data (i.e., voice) received from the associated MSC 20 through MSC interface 48 is routed through switching resources 50 for wireless transfer to MSs 12 via RBSs 52.

Figure 9:
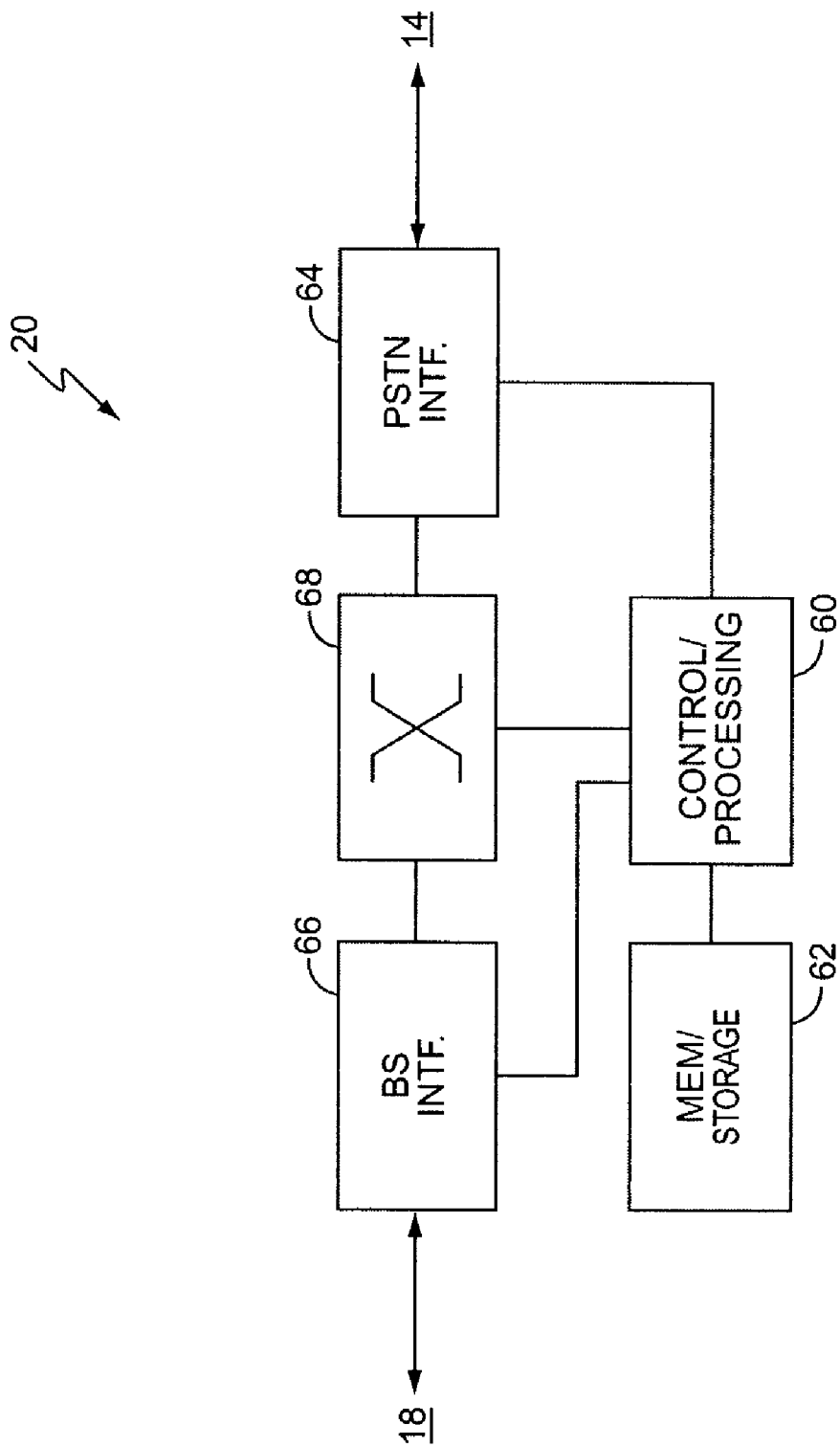
FIG. 9 is a diagram of an exemplary mobile switching center as might be used in the network of FIG. 1.

In similar fashion, FIG. 9 illustrates an exemplary MSC 20 as comprising a control/processing system 60, associated memory/storage 62, a BS interface 66, a PSTN interface 64, and associated switching resources 68. A given MSC 20 associated with a target BS 18 as in the above examples might cooperate with the BS 18 to form or generate dummy identification parameters provided to the MS 12 in accordance with the present invention. Of course, as noted, the present invention may be practiced in a variety of ways, and is not dependent on which network entity stores, forms, or otherwise generates the dummy identification parameter(s) sent to the MS 12.

Figure 10:
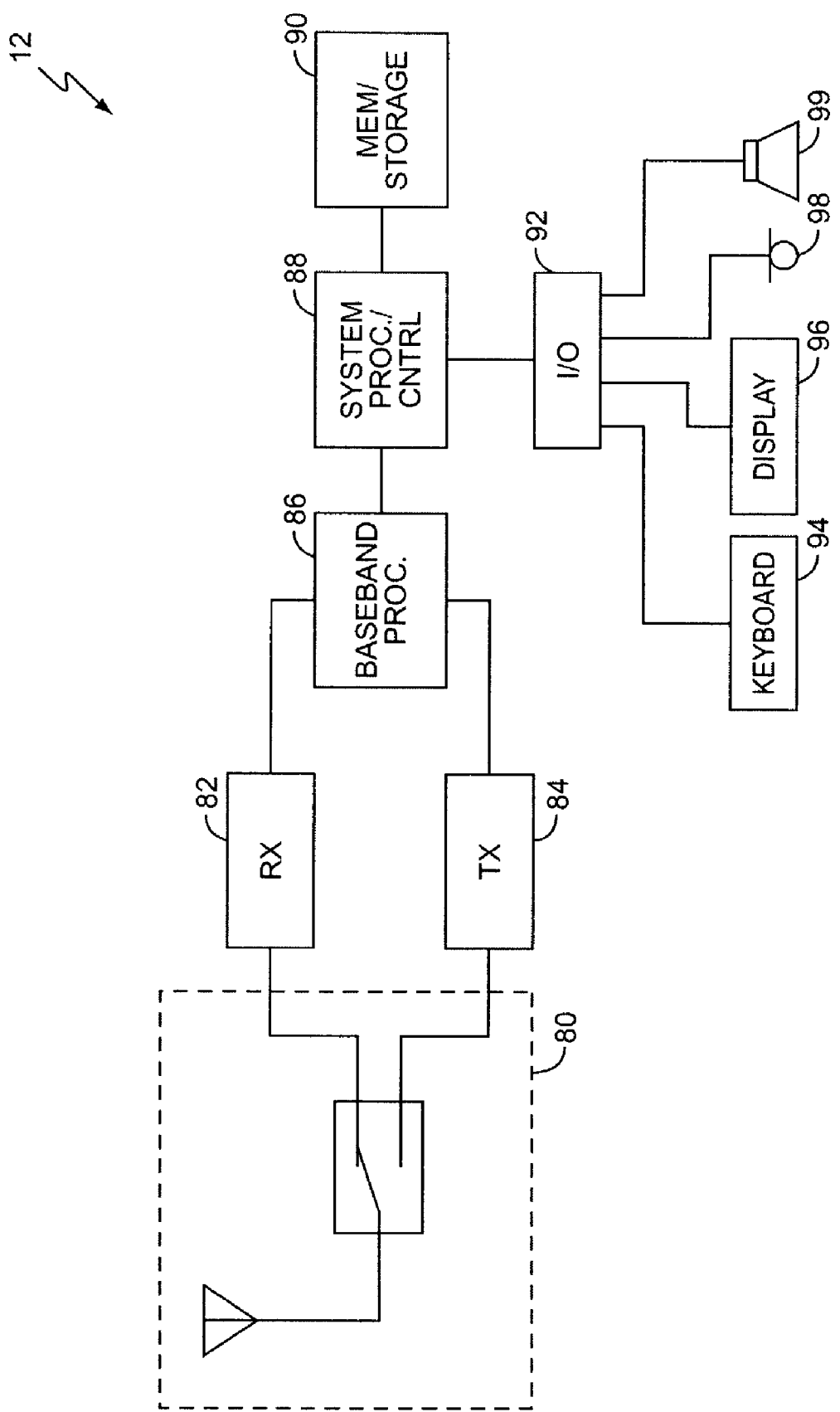
FIG. 10 is a diagram of an exemplary mobile station as might be used in the network of FIG. 1.

Finally, FIG. 10 illustrates an exemplary architecture for the MS 12, of course the specific implementation of MSs 12 may be varied. Here, MS 12 comprises an antenna assembly 80, a radio receiver 82, a radio transmitter 84, baseband processing resources 86, a system controller 88, memory/storage 90, input/output (I/O) circuits 92, a keyboard 94, a display 96, a microphone or other audio input device 98, and a speaker or other audio output device 99.

In the context of the present invention, the MS 12 receives dummy and actual identification parameters through receiver 82, which generally provides downconversion, demodulation, and decoding, resulting in the transfer of received data from the receiver 82 to baseband processor 86. Network identification parameter information received by MS 12 might be processed by baseband processor 86, and further might be transferred to memory 90 for storage to be used in comparison operations as discussed above.

Of course, those skilled in the art will recognize that implementation details for the various network entities can vary greatly. Indeed, the particular architectural and functional arrangements adopted in a given communication network 10 are not important to practicing the present invention. That is, the present invention is concerned with the use of dummy network identification parameters to force MS re-registration under certain handoff conditions, and retains considerable flexibility in terms of where and how such dummy parameters are formed and stored. As such, the present invention is not limited by the foregoing exemplary details; rather it is limited only by the scope of the following claims and the reasonable equivalents thereof.

What is claimed is:

1. In a wireless communication network, a method of performing a hard handoff of a mobile station that supports concurrent voice and data services, comprising:
   receiving the mobile station in a hard handoff from a source base station at a target base station while the mobile station is engaged in an active voice call concurrently with a dormant packet data session; and
   transmitting, during said active voice call, one or more dummy network identification parameters from the target base station to the mobile station responsive to said hard handoff to the target base station, to force re-registration of the mobile station with the wireless communication network when the active voice call ends.

2. The method of claim 1, wherein transmitting one or more dummy network identification parameters comprises transmitting a dummy value for at least one of a System Identification (SID) value, a Network Identification (NID) value, and a Packet Zone Identification (PZID) value.

3. The method of claim 2, wherein transmitting a dummy value for at least one of a System Identification (SID) value, a Network Identification (NID) value, and a Packet Zone Identification (PZID) value comprises transmitting actual NID and SID values in conjunction with a dummy PZID value.

4. The method of claim 3, further comprising receiving origination messages from the mobile station at the network.

5. The method of claim 4, wherein receiving origination messages from the mobile station at the network comprises receiving, at the target base station, an enhanced origination message (EOM) that includes a prior PZID value associated with the source base station.

6. The method of claim 5, further comprising:
   generating a packet data registration message including the prior PZID value received from the mobile station; and
   sending the packet data registration message to a Packet Data Serving Node (PDSN) supporting packet data routing for the target base station.

7. The method of claim 4, wherein receiving origination messages from the mobile station at the network comprises receiving, at the target base station, an origination message (OM) that includes a dummy PZID value associated with the target base station.

8. The method of claim 7, further comprising:
   suppressing generation of a packet data registration message at the target base station responsive to recognizing the dummy PZID value received in the OM; and
   triggering re-registration of the mobile station with a home location register (HLR) associated with the mobile station responsive to receiving the OM from the mobile station.

9. The method of claim 4, wherein receiving origination messages from the mobile station at the network comprises receiving, at the target base station, an enhanced origination message (EOM) that includes a prior PZID value associated with the source base station.

10. The method of claim 9, further comprising initiating packet data re-registration of the mobile station responsive to receiving the EOM.

11. The method of claim 10, further comprising:
   determining whether the prior PZID value is a true or false PZID value; and including the prior PZID value in a packet data registration message used to initiate packet data re-registration of the mobile station responsive to receiving the EOM.

12. The method of claim 11, further comprising:
deriving a true PZID value from the prior PZID value if the prior PZID value is a false PZID value; and
including the prior PZID value in a packet data registration message used to initiate packet data re-registration of the mobile station responsive to receiving the EOM.

13. The method of claim 1, wherein transmitting one or more dummy network identification parameters from the target base station to the mobile station while the voice call is active comprises sending one or more dummy network identifiers associated with mobility management for circuit-switched call service.

14. The method of claim 1, wherein transmitting one or more dummy network identification parameters from the target base station to the mobile station while the voice call is active comprises sending one or more dummy network identifiers associated with mobility management for packet-switched call service.

15. The method of claim 1, wherein sending the dummy network identification information comprises sending one or more dummy network identification values as part of an in-system traffic message sent to the mobile station by the target base station on a communication channel associated with the active voice call.

16. The method of claim 15, wherein the wireless communication network comprises a 1xEV-DV network, and the in-system traffic message comprises an In System Traffic Parameters (ISTP) message.

17. The method of claim 1, further comprising:
receiving the one or more dummy network identification parameters at the mobile station from the target base station while the mobile station is engaged in the active voice call; and
storing the one or more dummy network identification parameters at the mobile station.

18. The method of claim 17, further comprising monitoring a common channel transmitted by the target base station at the mobile station to obtain actual network identification parameters.

19. The method of claim 18, further comprising:
comparing the one or more dummy network identification parameters to the actual network identification parameters; and
initiating re-registration of the mobile station with the wireless communication network upon recognizing a mismatch between the dummy and actual network identification parameters.

20. The method of claim 19, further comprising updating home location register (HLR) routing information for the mobile station responsive to the mobile station re-registering with the wireless communication network.

21. The method of claim 1, wherein transmitting one or more dummy network identification parameters from the target base station to the mobile station while the voice call is active comprises transmitting the one or more dummy network identification parameters only if the hard handoff is an inter-MSC handoff.

22. The method of claim 21, wherein the target base station determines whether the hard handoff is an inter-MSC handoff.

23. The method of claim 21, wherein a target mobile switching center (MSC) associated with the target base station determines whether the hard handoff is an inter-MSC handoff.

24. A base station supporting concurrent circuit-switched and packet-switched services for use in a wireless communication network, the base station operative to:
receive a given mobile station in a hard handoff while the mobile station is engaged in an active voice call concurrently with a dormant packet data session; and
transmit to the mobile station, during said active voice call, a first message including one or more dummy network identification parameters responsive to said hard handoff, to force re-registration of the mobile station with the wireless communication network when the active voice call ends.

25. The base station of claim 24, wherein the base station transmits true network identification parameters on a broadcast channel for use by mobile stations operating in a coverage area of the base station.

26. The base station of claim 24, wherein the base station transmits the first message responsive to an indication from a mobile switching center that the handoff to the base station is a hard handoff.

27. The base station of claim 24, wherein the base station receives the one or more dummy parameters from the mobile switching center for transmission to the mobile station.

28. The base station of claim 24, wherein the base station is further operative to determine that the handoff of the mobile station is a hard handoff and thereby transmit the first message responsive to such recognition.

29. The base station of claim 24, wherein the base station is further operative to receive an indication from a supporting mobile switching center that the handoff is a hard handoff, and thereby transmit the first message responsive to such indication.

30. The base station of claim 24, wherein the base station is further operative to:
receive an origination message that includes a Packet Zone Identifier (PZID) from the mobile station; and
suppress packet-switched re-registration of the mobile station if the PZID matches a dummy PZID associated with the base station.

31. The base station of claim 30, wherein the base station is further operative to initiate circuit-switched re-registration of the mobile station if the PZID matches the dummy PZID associated with the base station.

32. The base station of claim 30, wherein the base station is further operative to initiate packet-data re-registration of the mobile station if the PZID is a dummy PZID that does not match the dummy PZID associated with the base station.

33. The base station of claim 32, wherein the base station is further operative to attempt to derive a true PZID from the dummy PZID received from the mobile station, and, if the attempt is successful, include the derived true PZID in a packet-switched re-registration message sent by the base station to initiate the packet-switched re-registration of the mobile station.

34. The base station of claim 24, wherein the one or more dummy network identification parameters includes a dummy value for at least one of a System Identification (SID), a Network Identification (NID), and a Packet Zone Identification (PZID).

35. The base station of claim 34, wherein the first message includes a dummy value for at least one of the SID and NID, and includes a true value for the PZID, such that the mobile station recognizes a SID/NID mismatch at the end of the active voice call based on resumed monitoring of an overhead channel transmitted by the base station on which true network identification parameters are broadcast by the base station.

36. The base station of claim 24, wherein the one or more dummy network identification parameters includes a dummy PZID value associated with the base station, and wherein the mobile station broadcasts a true PZID value on one or more overhead channels, such that the mobile station obtains the true PZID value for the base station based on monitoring the one or more overhead channels after ending the active voice call.

37. The base station of claim 36, wherein the base station receives an origination message (OM) from the mobile station after the voice call ends, said OM generated by the mobile station responsive to the mobile station obtaining the true PZID value, and wherein the mobile station includes the dummy PZID value associated with the base station in the OM.

38. The base station of claim 37, wherein the base station:
 recognizes the dummy PZID value included in the OM as matching the dummy PZID value associated with the base station; and
 suppresses packet data re-registration of the mobile station.

39. The base station of claim 37, wherein the base station initiates circuit-switched re-registration of the mobile station responsive to receiving the OM.

40. The base station of claim 24, wherein the base station transmits the first message only if the hard handoff is an inter-MSC handoff.

41. The base station of claim 40, wherein the base station determines whether the hard handoff is an inter-MSC handoff.

42. A mobile switching center (MSC) supporting concurrent circuit-switched and packet-switched services for use in a wireless communication network, the MSC operative to:
 receive a given mobile station in a hard handoff while the mobile station is engaged in an active voice call concurrently with a dormant packet data session; and
 transmit to the mobile station, during said active voice call, a first message including one or more dummy network identification parameters responsive to said hard handoff, to force re-registration of the mobile station with the wireless communication network when the active voice call ends.

43. The MSC of claim 42, wherein the MSC transmits the first message to the mobile station only if the hard handoff is an inter-MSC handoff.

44. The MSC of claim 43, wherein the MSC determines whether the hard handoff is an inter-MSC handoff based on inter-MSC signaling.

45. The MSC of claim 43, wherein the MSC determines whether the hard handoff is an inter-MSC handoff based on receiving an IS-41 signaling message.

46. The MSC of claim 42, wherein the MSC transmits the first message to the mobile station via a target base station controlled by the MSC.

47. The MSC of claim 46, wherein the MSC transmits the first message to the mobile station after the target base station completes handoff processing associated with receiving the mobile station in hard handoff.

* * * * *

UNITED STATES PATENT AND TRADEMARK OFFICE
CERTIFICATE OF CORRECTION

| | | |
|---|---|---|
| PATENT NO. | : 7,623,865 B2 | Page 1 of 1 |
| APPLICATION NO. | : 10/210146 | |
| DATED | : November 24, 2009 | |
| INVENTOR(S) | : Julka et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 459 days.

Signed and Sealed this

Twenty-sixth Day of October, 2010

David J. Kappos
*Director of the United States Patent and Trademark Office*